United States Patent
Nakada (10) Patent No.: US 8,116,795 B2
(45) Date of Patent: Feb. 14, 2012

(54) TRANSMISSION TIMING CONTROL SYSTEM AND METHOD, AND MOBILE STATION FOR USE THEREIN

(75) Inventor: Suguru Nakada, Tokyo (JP)

(73) Assignee: NEC Corporation, Tokyo (JP)

( * ) Notice: Subject to any disclaimer, the term of this patent is extended or adjusted under 35 U.S.C. 154(b) by 629 days.

(21) Appl. No.: 12/280,206

(22) PCT Filed: Feb. 19, 2007

(86) PCT No.: PCT/JP2007/052946
§ 371 (c)(1),
(2), (4) Date: Aug. 21, 2008

(87) PCT Pub. No.: WO2007/099800
PCT Pub. Date: Sep. 7, 2007

(65) Prior Publication Data
US 2010/0232557 A1 Sep. 16, 2010

(30) Foreign Application Priority Data
Feb. 28, 2006 (JP) .................................. 2006-051416

(51) Int. Cl.
*H04B 15/00* (2006.01)
(52) U.S. Cl. ............................ 455/506; 455/65; 455/504
(58) Field of Classification Search .................. 455/509, 455/510, 65, 506, 504; 370/329, 348
See application file for complete search history.

(56) References Cited

U.S. PATENT DOCUMENTS

| | | | |
|---|---|---|---|
| 6,574,212 B1 * | 6/2003 | Halton et al. | 370/348 |
| 7,024,216 B2 * | 4/2006 | Vukovic et al. | 455/509 |
| 7,301,921 B2 * | 11/2007 | Heo | 370/329 |
| 2005/0254467 A1 | 11/2005 | Li et al. | |

FOREIGN PATENT DOCUMENTS

JP 09065464 A 3/1997
(Continued)

OTHER PUBLICATIONS

International Search Report for PCT/JP2007/052946 mailed Apr. 24, 2007.
(Continued)

Primary Examiner — Raymond Dean (57) ABSTRACT

It is an object of the present invention to hold the detecting range of a timing correlator in a base station to the minimum required and to reduce the circuit scale and power requirement of the timing correlator. Before a mobile station transmits a data signal, it transmits a signal referred to as a preamble signal to measure the transmission timing to the base station. If the base station detects the preamble signal with a timing correlator having a limited circuit scale, then the base station transmits a transmission permission signal to the mobile station. If the mobile station fails to receive the transmission permission signal over a given period of time after it has transmitted the preamble signal, then the mobile station retransmits the preamble signal at a changed transmission timing based on the received electric power of a control signal transmitted continuously from the base station and information included in the control signal. The mobile station repeatedly retransmits the preamble signal until it receives the transmission permission signal. If the mobile station receives the transmission permission signal from the base station, then the mobile station transmits a data signal at the transmission timing of the preamble signal transmitted immediately prior to the reception of the transmission permission signal.

12 Claims, 4 Drawing Sheets

FOREIGN PATENT DOCUMENTS

| | | |
|---|---|---|
| JP | 2001285248 A | 10/2001 |
| JP | 2001285943 A | 10/2001 |
| JP | 2002208879 A | 7/2002 |
| JP | 2002532983 A | 10/2002 |
| JP | 2003283373 A | 10/2003 |
| JP | 2005341078 A | 12/2005 |

OTHER PUBLICATIONS

IPRP of PCT/JP2007/052946, Sep. 2, 2008, NEC Corporation.

US Office Action for U.S. Appl. No. 13/182,367 mailed Oct. 17, 2011.

* cited by examiner

TRANSMISSION TIMING CONTROL SYSTEM AND METHOD, AND MOBILE STATION FOR USE THEREIN

TECHNICAL FIELD

The present invention relates to a transmission timing control system and method for data in a mobile communication system, and a mobile station for use therein.

BACKGROUND ART

Nowadays, mobile phone systems have grown higher in transmission rate and more enhanced in functionality. The transmission rate, which was 9.6 kbps or 28.8 kbps before, has recently increased to 384 kbps or 14.4 Mbps, and will be expanded to 30 Mbps or even 100 Mbps in the future. To realize the high transmission rate, the introduction of various technologies including OFDM (Orthogonal Frequency Division Multiplexing) and MIMO (Multiple Input Multiple Output) as well as diversity reception and transmission power control is scheduled.

Under these circumstances, wireless base stations are required to have many functions and high processing capabilities. As a result, there are concerns about increased manufacturing costs and increased power requirements for the development of new wireless base stations.

The present invention is focused on a timing correlator for use in measuring the received timings of signals transmitted from wireless mobile stations in order to simplify the wireless base station. The timing correlator is a functional device for determining a plurality of points (referred to as a delay profile) of cross correlation between a signal having a predetermined pattern and a received signal at shifted timings in order to perform diversity reception and for determining the timing of highest correlation. The timing correlator is also called a path searcher, and is an indispensable functional device for CDMA communication systems for RAKE reception.

Generally, as disclosed in Patent Document 1 (JP-A No. 2003-283373), FIG. 8 and paragraph [0004], the timing correlator has its range of correlation-determining timings widened and its circuit scale increased depending on the radius of an area covered by its wireless base station. This is because wireless mobile stations transmit respective signals at timings of their own and are scattered about in the area, so that they have different propagation delay times to the wireless base station. Should the wireless mobile stations take timings to transmit signals into account, the detecting range of the timing correlator provided in the wireless base station may be held to the minimum required and hence its circuit scale may be reduced.

Patent Document 1: JP-A No. 2003-283373

DISCLOSURE OF THE INVENTION

Problems to be Solved by the Invention

As described above, the wireless base station has the timing correlator for measuring the received timings of wireless signals transmitted from wireless mobile stations. The circuit scale of the timing correlator depends on the magnitude of variations of propagation delay times between the wireless mobile stations and the wireless base station. Generally, as the area covered by the wireless base station is wider, the variations of propagation delay times are greater, thereby making the circuit scale of the timing correlator larger. Therefore, if the area covered by the wireless base station becomes wider, then the circuit scale of the timing correlator which performs a path search becomes larger, and its circuit has an inevitably higher power requirement.

The present invention has been made in view of the above problems. It is an object of the present invention is to provide a transmission timing control system and method for holding the detecting range of a timing correlator in a wireless base station to the minimum required and for reducing the circuit scale and power requirement of the timing correlator, and a mobile station for use in such a transmission timing control system and method.

Means for Solving the Problems

According to the present invention, there is provided a data transmission timing control system for controlling the timing of data transmission from a mobile station to a base station, wherein the mobile station comprises means for transmitting a transmission permission request signal to the base station at a transmission timing represented by the sum of a periodic reference timing and an offset value, means for, if a transmission permission signal transmitted from the base station in response to the reception by the base station of the transmission permission request signal is not received, retransmitting the transmission permission request signal repeatedly while changing the transmission timing until the transmission permission signal is received, and means for, if the transmission permission signal is received, transmitting data at the transmission timing immediately before the transmission permission signal is received.

According to the present invention, there is provided a data transmission timing control system for controlling the timing of data transmission from a mobile station to a base station, wherein the mobile station comprises means for transmitting a transmission permission request signal to the base station at a transmission timing represented by the sum of a periodic reference timing and an offset value, means for, if a transmission permission signal transmitted from the base station in response to the reception by the base station of the transmission permission request signal is not received, changing the transmission timing once and retransmitting the transmission permission request signal repeatedly while changing the transmitted electric power until the transmission permission signal is received, and means for, if the transmission permission signal is received, transmitting data at the transmission timing immediately before the transmission permission signal is received.

According to the present invention, there is provided a data transmission timing control method for controlling the timing of data transmission from a mobile station to a base station, wherein the mobile station performs a process comprising the step of transmitting a transmission permission request signal to the base station at a transmission timing represented by the sum of a periodic reference timing and an offset value, the step of, if a transmission permission signal transmitted from the base station in response to the reception by the base station of the transmission permission request signal is not received, retransmitting the transmission permission request signal repeatedly while changing the transmission timing until the transmission permission signal is received, and the step of, if the transmission permission signal is received, transmitting data at the transmission timing immediately before the transmission permission signal is received.

According to the present invention, there is provided a data transmission timing control method for controlling the timing of data transmission from a mobile station to a base station, wherein the mobile station performs a process comprising the step of transmitting a transmission permission request signal to the base station at a transmission timing represented by the sum of a periodic reference timing and an offset value, the step of, if a transmission permission signal transmitted from the base station in response to the reception by the base station of the transmission permission request signal is not received, changing the transmission timing once and retransmitting the transmission permission request signal repeatedly while changing the transmitted electric power until the transmission permission signal is received, and the step of, if the transmission permission signal is received, transmitting data at the transmission timing immediately before the transmission permission signal is received.

According to the present invention, there is provided a mobile station comprising means for transmitting a transmission permission request signal to a base station at a transmission timing represented by the sum of a periodic reference timing and an offset value, means for, if a transmission permission signal transmitted from the base station in response to the reception by the base station of the transmission permission request signal is not received, retransmitting the transmission permission request signal repeatedly while changing the transmission timing until the transmission permission signal is received, and means for, if the transmission permission signal is received, transmitting data at the transmission timing immediately before the transmission permission signal is received.

According to the present invention, there is provided a mobile station comprising means for transmitting a transmission permission request signal to the base station at a transmission timing represented by the sum of a periodic reference timing and an offset value, means for, if a transmission permission signal transmitted from the base station in response to the reception by the base station of the transmission permission request signal is not received, changing the transmission timing once and retransmitting the transmission permission request signal repeatedly while changing the transmitted electric power until the transmission permission signal is received, and means for, if the transmission permission signal is received, transmitting data at the transmission timing immediately before the transmission permission signal is received.

According to the present invention, there is provided a program for enabling a computer to operate a mobile station for controlling the timing of data transmission to a base station, comprising a process for transmitting a transmission permission request signal to the base station at a transmission timing represented by the sum of a periodic reference timing and an offset value, a process for, if a transmission permission signal transmitted from the base station in response to the reception by the base station of the transmission permission request signal is not received, retransmitting the transmission permission request signal repeatedly while changing the transmission timing until the transmission permission signal is received, and a process for, if the transmission permission signal is received, transmitting data at the transmission timing immediately before the transmission permission signal is received.

According to the present invention, there is provided a program for enabling a computer to operate a mobile station for controlling the timing of data transmission to a base station, comprising a process for transmitting a transmission permission request signal to the base station at a transmission timing represented by the sum of a periodic reference timing and an offset value, a process for, if a transmission permission signal transmitted from the base station in response to the reception by the base station of the transmission permission request signal is not received, changing the transmission timing once and retransmitting the transmission permission request signal repeatedly while changing the transmitted electric power until the transmission permission signal is received, and a process for, if the transmission permission signal is received, transmitting data at the transmission timing immediately before the transmission permission signal is received.

Operation of the present invention will be described below. First, before a wireless mobile station transmits a wireless data signal, it transmits a transmission permission request signal referred to as a preamble signal to measure a transmission timing to a wireless base station. If the wireless base station detects the preamble signal with a timing correlator having a limited circuit scale, then the wireless base station transmits a transmission permission signal to the wireless mobile station.

If the wireless mobile station fails to receive the transmission permission signal over a given period of time after it has transmitted the preamble signal, then the wireless mobile station retransmits the preamble signal at a changed transmission timing based on the received electric power of a control signal transmitted continuously from the wireless base station and information carried by the control signal. The wireless mobile station repeatedly retransmits the preamble signal until it receives the transmission permission signal. If the wireless mobile station receives the transmission permission signal from the wireless base station, then the wireless mobile station transmits a data signal at the transmission timing of the preamble signal transmitted immediately prior to the reception of the transmission permission signal.

According to the present invention, the circuit scale of the timing correlator provided in the wireless base station is reduced, and the power requirement and manufacturing cost of the wireless base station are reduced.

DESCRIPTION OF REFERENCE CHARACTERS 1 wireless base station
2 wireless mobile station
11, 21 antenna
12, 22 wireless modulator
13, 23 baseband processor
14, 24 controller
131, 231 timing correlator
132, 232 RAKE receiver
133, 233 symbol rate signal processor
134, 235 spreader
234 transmission timing adjuster

BEST MODE FOR CARRYING OUT THE INVENTION

Figure 1:
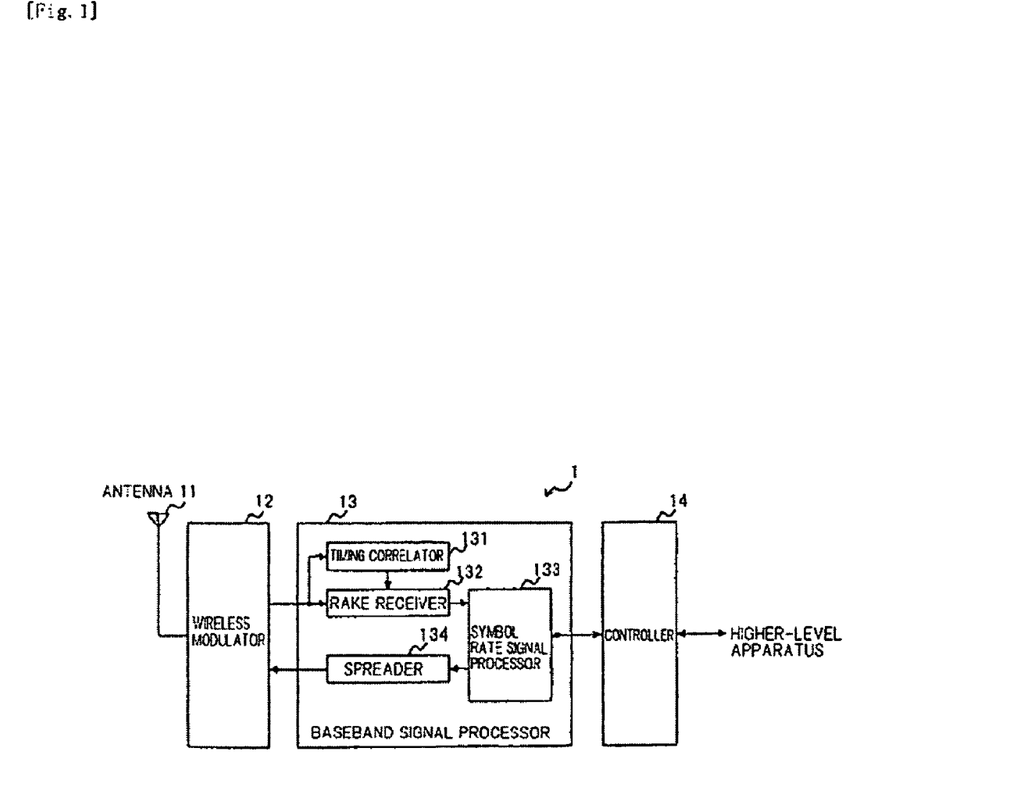
FIG. 1 is a schematic functional block diagram of a wireless base station to which an embodiment of the present invention is applied.
Figure 2:
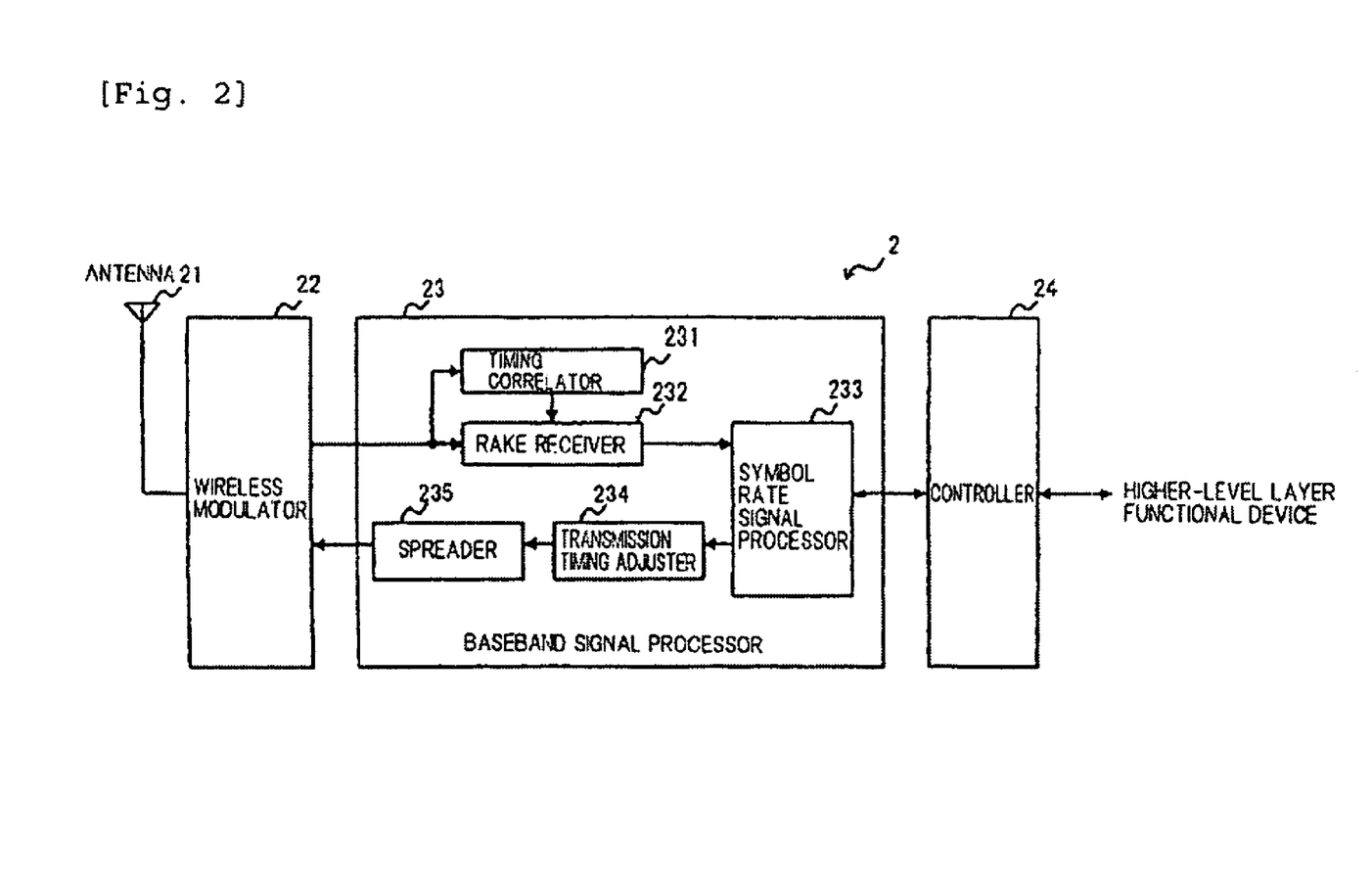
FIG. 2 is a schematic functional block diagram of a wireless mobile station to which the embodiment of the present invention is applied.

An embodiment of the present invention will be described below with reference to the drawings. FIGS. 1 and 2 are block diagrams of wireless base station 1 and wireless mobile station 2 to which an embodiment of the present invention is applied, showing the configurations of a wireless base station and a wireless mobile station according to a general CDMA scheme.

According to the present embodiment, the circuit scale of timing correlator 131 provided in wireless base station 1 can be reduced.

A preamble signal which is a transmission permission request signal sent from wireless mobile station 2 shown in FIG. 2 is input through antenna 11 to wireless modulator 12, which demodulates the preamble signal into a baseband signal that is supplied to baseband signal processor 13.

In baseband signal processor 13, timing correlator 131 performs a path search to detect the baseband signal. When the baseband signal is detected, its information is sent through RAKE receiver 132 to symbol rate processor 133. Symbol rate processor 133 generates a code sequence serving as a transmission permission signal. Thereafter, spreader 134 performs a spreading process on the transmission permission signal and wireless modulator 12 performs a modulating process on the transmission permission signal. The transmission permission signal is then transmitted from antenna 11 to the wireless mobile station. Controller 14 has a function to interface with a higher-level apparatus and a network, and controls antenna 11, wireless modulator 12, and baseband processor 13 according to various settings sent from the higher-level apparatus.

Wireless mobile station 2 shown in FIG. 2 has the configuration of a physical layer of a general wireless mobile station. According to the present embodiment, transmission timing adjuster 234 for adjusting transmission timing is disposed between symbol rate processor 233 and spreader 235.

A preamble signal and a wireless data signal are generated as code sequence by symbol rate processor 233, and thereafter held until a predetermined transmission timing by transmission timing adjuster 234. Then, the preamble signal and the wireless data signal are input to spreader 235. Spreader 235 performs a spreading process on the preamble signal and the wireless data signal, which are subsequently modulated by wireless modulator 22. The preamble signal and the wireless data signal that are modulated are transmitted from antenna 21 to the wireless base station shown in FIG. 1.

The transmission permission signal transmitted from wireless base station 1 is demodulated into a baseband signal by wireless modulator 22. The demodulated transmission permission signal is supplied to baseband signal processor 23. In baseband signal processor 23, timing correlator 231 performs a signal detecting process. When a signal is detected, its information is sent through RAKE receiver 232 to symbol rate processor 233 and controller 24. Controller 24 has a function to interface with a higher-level layer functional device, and controls antenna 21, wireless modulator 22, and baseband processor 23 according to various settings sent from the higher-level functional device.

Figure 3:
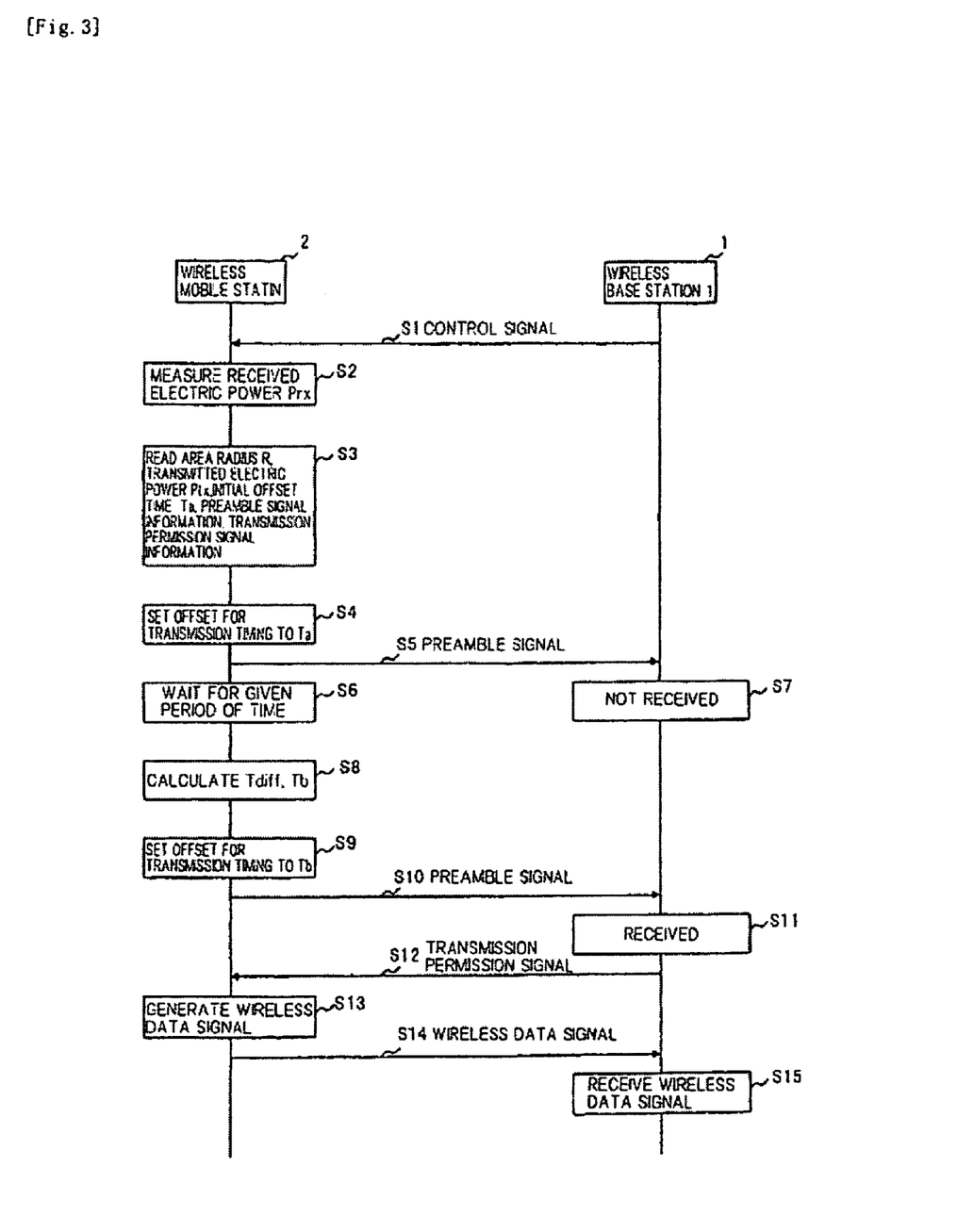
FIG. 3 is a sequence diagram showing operation of the embodiment of the present invention.
Figure 4:
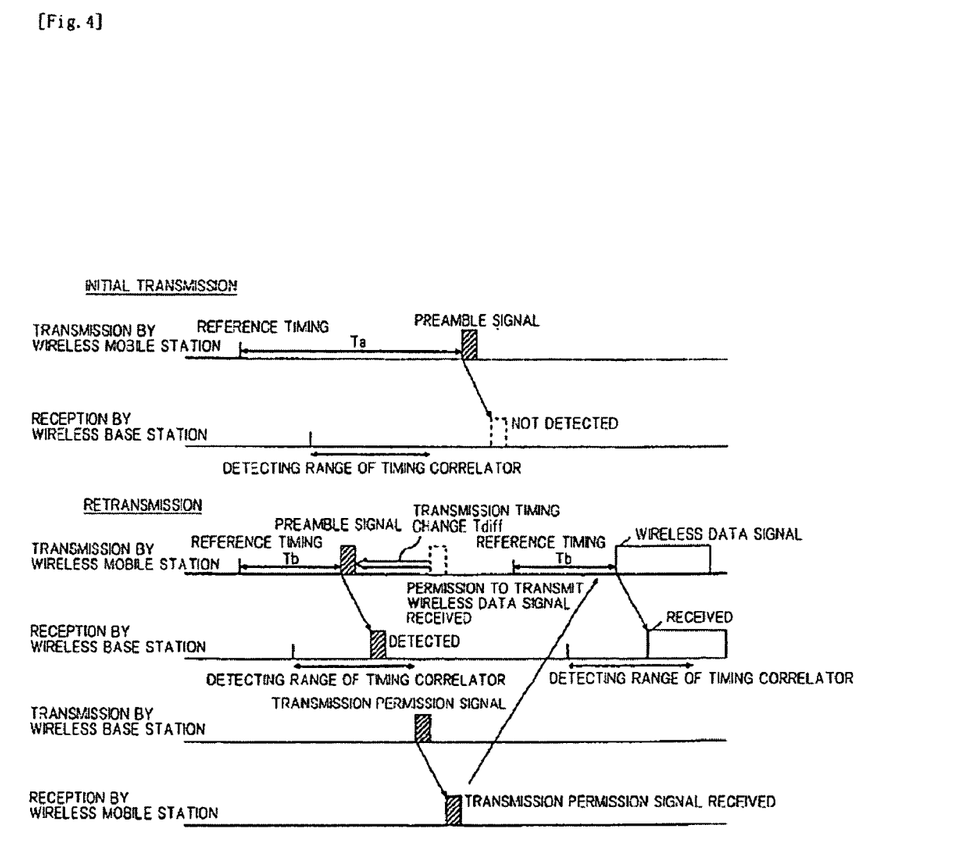
FIG. 4 is a timing chart showing operation of the embodiment of the present invention.

FIG. 3 is a sequence diagram showing operation of the present embodiment, and FIG. 4 is a diagram showing operational timings thereof. The present embodiment is applied by way of example to a mobile telephone system according to a general CDMA scheme which comprises wireless base station 1 shown in FIG. 1 and wireless mobile station 2 shown in FIG. 2. It is assumed that before the mobile telephone system starts to operate, the wireless mobile station will have received in advance a control signal including information about the wireless base station from the wireless base station.

Before wireless mobile station 2 transmits a wireless data signal, it transmits a preamble signal that has been determined between itself and wireless base station 1. Wireless mobile station 2 transmits the wireless data signal at a transmission timing which is represented by the sum of a predetermined reference timing and an initial offset time Ta indicated by the wireless base station (or a predetermined initial offset time).

When wireless mobile station 2 receives the control signal (step S1), wireless mobile station 2 measures the received electric power Prx of the control signal (step S2). The control signal includes initial offset time Ta referred to above, area radius R of the cell of the wireless base station which is another parameter to be used subsequently, transmitted electric power Ptx at the wireless base station of the control signal transmitted from the wireless base station, preamble signal information, and transmission permission signal information. Wireless mobile station 2 acquires the various pieces of information from the received control signal (step S3).

Then, wireless mobile station 2 sets initial offset time Ta acquired in step S3 as an offset for the transmission timing (step S4), transmits a preamble signal (step S5), and waits for a given period of time (step S6).

The preamble signal transmitted in step S5 reaches wireless base station 1. The preamble signal reaches wireless base station 1 at a timing beyond the range in which timing correlator 131 of wireless base station 1 can detect a signal, and wireless base station 1 is unable to receive the preamble signal (step S7). Therefore, wireless base station 1 does not return a response to wireless mobile station 2.

Since wireless mobile station 2 does not receive a response, i.e., a transmission permission signal, from the wireless base station upon elapse of the given period of time in step Se, wireless mobile station 2 calculates time Tdiff to change the transmission timing and new offset time Tb from the reference timing (step S8), sets offset time Tb acquired in step S8 as an offset for the transmission timing (step S9), and transmits the preamble signal again (step S10).

At this time, Tdiff is determined by a function having the following variables (parameters):

(1) radius R of the area covered by the wireless base station;

(2) transmitted electric power Ptx at the wireless base station of the control signal transmitted continuously from the wireless base station;

(3) received electric power Prx at the wireless mobile station of the control signal transmitted continuously from the wireless base station; and (4) number Np of times that the preamble signal has been transmitted.

Specifically, the function may be represented by $Tdiff=\alpha R(Ptx-Prx)+\beta Np+\gamma$ ($\alpha$, $\beta$, $\gamma$ are corrective coefficients) or $Tdiff=\alpha R+\delta(Ptx-Prx)+\beta Np+\gamma$ ($\alpha$, $\delta$, $\beta$, $\gamma$ are corrective coefficients).

It is assumed that R, Ptx are indicated by the control signal from the wireless base station, as described above. As the value of R is greater, the propagation delay from the wireless base station is considered to be greater, and hence a change in the transmission timing may be made greater. The attenuation of the electric power over the wireless transmission path is determined by calculating the difference between Pix and Prx. The greater the value of the difference between Ptx and Fix, the greater is the difference of the wireless mobile station from the wireless base station, and the propagation delay is considered to be greater, so that a change in the transmission timing may be made greater. Depending on number Np of times that the preamble signal has been transmitted, a change in the transmission timing may be increased or reduced.

In wireless mobile station 2, transmission timing adjuster 234 transmits the preamble signal at different time Tdiff repeatedly until timing correlator 131 of wireless base station 1 detects the preamble signal. It is assumed that wireless base station 1 detects the preamble signal when wireless mobile station 2 transmits the preamble signal at a timing which is represented by the sum of the reference timing and offset time Tb (step S11).

Having detected the preamble signal, wireless base station 1 transmits a transmission permission signal that has been determined between itself and wireless mobile station 2 (step S12). Wireless mobile station 2 receives the transmission permission signal, and generates a wireless data signal (step S13). Wireless mobile station 2 transmits the wireless data signal at the timing represented by the sum of the reference timing and offset time Tb, which was used previously to transmit the preamble signal (step S14). The transmitted wireless data signal is received by wireless base station 1 within the detecting range of the timing correlator (step S15), and is thereafter decoded.

The present invention is not limited to the above embodiment, but is also applicable to a mobile communication network according to another scheme or a distributed autonomous wireless network. The wireless data signal may be of a random-access channel type or a dedicated channel type, and the variables used to determine Tdiff are not limited to those described in the embodiment.

Furthermore, the manner in which the electric power is consumed by the wireless mobile station to transmit the preamble signal may be modified provide the system with different features. For example, if the wireless mobile station transmits the preamble signal using the maximum transmitted electric power, then though it may possibly interfere greatly with the signals transmitted from other wireless mobile stations, the preamble signal can be detected almost certainly by the wireless base station insofar as it falls in the detecting range of the timing correlator. The wireless mobile station can thus transmit the wireless data signal immediately, resulting in an improved throughput.

Conversely, if the preamble signal is not to interfere with the signals transmitted from other wireless mobile stations, then the wireless mobile signal may transmit the preamble signal with using a small amount of transmitted electric power immediately after the value of Tdiff has been changed. If no transmission permission signal is returned, then the wireless mobile signal may transmit the preamble signal using slightly increased transmitted electric power with the value of Tdiff remaining unchanged. This process may be repeated until a transmission permission signal is returned.

The operation sequence of the timing control operation of the above embodiment may be stored as a program in a recording medium such as a ROM or the like, and may be read and executed by a computer.

The invention claimed is:

1. A data transmission timing control system for controlling the timing of data transmission from a mobile station to a base station, wherein said mobile station comprises:
   means for transmitting a transmission permission request signal to said base station at a transmission timing represented by the sum of a periodic reference timing and an offset value;
   means for, if a transmission permission signal transmitted from said base station in response to the reception by said base station of said transmission permission request signal is not received, retransmitting said transmission permission request signal repeatedly while changing the transmission timing until said transmission permission signal is received; and
   means for, if said transmission permission signal is received, transmitting data at the transmission timing that was used immediately before said transmission permission signal was received,
   wherein a change in the transmission timing is determined depending on the radius of an area covered by said base station, the transmitted electric power at said base station of a control signal transmitted from said base station, the received electric power at said mobile station of the control signal, and the number of times that said transmission permission request signal is transmitted.

2. A data transmission timing control system for controlling the timing of data transmission from a mobile station to a base station, wherein said mobile station comprises:
   means for transmitting a transmission permission request signal to said base station at a transmission timing represented by the sum of a periodic reference timing and an offset value;
   means for, if a transmission permission signal transmitted from said base station in response to the reception by said base station of said transmission permission request signal is not received, changing said transmission timing once and retransmitting said transmission permission request signal repeatedly while changing the transmitted electric power until said transmission permission signal is received; and
   means for, if said transmission permission signal is received, transmitting data at the transmission timing that was used immediately before said transmission permission signal was received,
   wherein a change in the, transmission timing is determined depending on the radius of an area covered by said base station, the transmitted electric power at said base station of a control signal transmitted from said base station, the received electric power at said mobile station of the control signal, and the number of times that said transmission permission request signal is transmitted.

3. The data transmission timing control system according to claim 2, wherein said base station includes means for transmitting said transmission permission signal in response to the reception of said transmission permission request signal to said mobile station.

4. A data transmission timing control method for controlling the timing of data transmission from a mobile station to a base station, wherein said mobile station performs a process comprising:
   the step of transmitting a transmission permission request signal to said base station at a transmission timing represented by the sum of a periodic reference timing and an offset value;
   the step of, if a transmission permission signal transmitted from said base station in response to the reception by said base station of said transmission permission request signal is not received, retransmitting said transmission permission request signal repeatedly while changing the transmission timing until said transmission permission signal is received; and
   the step of, if said transmission permission signal is received, transmitting data at the transmission timing that was used immediately before said transmission permission signal was received,
   wherein a change in the transmission timing is determined depending on the radius of an area covered by said base station, the transmitted electric power of a control signal at said base station transmitted from said base station, the received electric power at said mobile station of the control signal, and the number of times that said transmission permission request signal is transmitted.

5. A data transmission timing control method for controlling the timing of data transmission from a mobile station to a base station, wherein said mobile station performs a process comprising:
   the step of transmitting a transmission permission request signal to said base station at a transmission timing represented by the sum of a periodic reference timing and an offset value;
   the step of, if a transmission permission signal transmitted from said base station in response to the reception by said base station of said transmission permission request signal is not received, changing said transmission timing once and retransmitting said transmission permission request signal repeatedly while changing the transmitted electric power until said transmission permission signal is received; and the step of, if said transmission permission signal is received, transmitting data at the transmission timing that was used immediately before said transmission permission signal was received, wherein a change in the transmission timing is determined depending on the radius of an area covered by said base station, the transmitted electric power of a control signal at said base station transmitted from said base station, the received electric power at said mobile station of the control signal, and the number of times that said transmission permission request signal is transmitted.

6. The data transmission timing control method according to claim 5, wherein said base station performs a process including the step of transmitting said transmission permission signal in response to the reception of said transmission permission request signal to said mobile station.

7. A mobile station comprising:
means for transmitting a transmission permission request signal to a base station at a transmission timing represented by the sum of a periodic reference timing and an offset value;
means for, if a transmission permission signal transmitted from said base station in response to the reception by said base station of said transmission permission request signal is not received, retransmitting said transmission permission request signal repeatedly while changing the transmission timing until said transmission permission signal is received; and
means for, if said transmission permission signal is received, transmitting data at the transmission timing that was used immediately before said transmission permission signal was received,
wherein a change in the transmission timing is determined depending on the radius of an area covered by said base station, the transmitted electric power at said base station of a control signal transmitted from said base station, the received electric power at said mobile station of the control signal, and the number of times that said transmission permission request signal is transmitted.

8. A mobile station comprising:
means for transmitting a transmission permission request signal to said base station at a transmission timing represented by the sum of a periodic reference timing and an offset value;
means for, if a transmission permission signal transmitted from said base station in response to the reception by said base station of said transmission permission request signal is not received, changing said transmission timing once and retransmitting said transmission permission request signal repeatedly while changing the transmitted electric power until said transmission permission signal is received; and
means for, if said transmission permission signal is received, transmitting data at the transmission timing that was used immediately before said transmission permission signal was received,
wherein a change in the transmission timing is determined depending on the radius of an area covered by said base station, the transmitted electric power at said base station of a control signal transmitted from said base station, the received electric power at said mobile station of the control signal, and the number of times that said transmission permission request signal is transmitted.

9. A program encoded on a non-transitory computer readable medium for enabling a computer to operate a mobile station for controlling the timing of data transmission to a base station, comprising:
a process for transmitting a transmission permission request signal to said base station at a transmission timing represented by the sum of a periodic reference timing and an offset value;
a process for, if a transmission permission signal transmitted from said base station in response to the reception by said base station of said transmission permission request signal is not received, retransmitting said transmission permission request signal repeatedly while changing the transmission timing until said transmission permission signal is received; and
a process for, if said transmission permission signal is received, transmitting data at the transmission timing that was used immediately before said transmission permission signal was received,
wherein a change in the transmission timing is determined depending on the radius of an area covered by said base station, the transmitted electric power at said base station of a control signal transmitted from said base station, the received electric power at said mobile station of the control signal, and the number of times that said transmission permission request signal is transmitted.

10. A program encoded on a non-transitory computer readable medium for enabling a computer to operate a mobile station for controlling the timing of data transmission to a base station, comprising:
a process for transmitting a transmission permission request signal to said base station at a transmission timing represented by the sum of a periodic reference timing and an offset value;
a process for, if a transmission permission signal transmitted from said base station in response to the reception by said base station of said transmission permission request signal is not received, changing said transmission timing once and retransmitting said transmission permission request signal repeatedly while changing the transmitted electric power until said transmission permission signal is received; and
a process for, if said transmission permission signal is received, transmitting data at the transmission timing that was used immediately before said transmission permission signal was received,
wherein a change in the transmission timing is determined depending on the radius of an area covered by said base station, the transmitted electric power at said base station of a control signal transmitted from said base station, the received electric power at said mobile station of the control signal, and the number of times that said transmission permission request signal is transmitted.

11. The data transmission timing control system according to claim 1, wherein said base station includes means for transmitting said transmission permission signal in response to the reception of said transmission permission request signal to said mobile station.

12. The data transmission timing control method according to claim 4, wherein said base station performs a process including the step of transmitting said transmission permission signal in response to the reception of said transmission permission request signal to said mobile station.

* * * * *